United States Patent
Bosch et al.

(10) Patent No.: US 8,097,975 B2
(45) Date of Patent: Jan. 17, 2012

(54) DRIVE SYSTEM FOR A MOTOR VEHICLE COMPRISING AN INTERNAL COMBUSTION ENGINE AND AN ELECTRIC MOTOR

(75) Inventors: Hermann Bosch, Esslingen (DE); Horst Brinkmeyer, Waiblingen (DE); Roland Kemmler, Stuttgart (DE); Markus Krauss, Waeschenbeuren (DE); Ing. Dietrich Sahm, Bad Urach (DE); Hans-Christoph Wolf, Stuttgart (DE); Anton Heni, Kernen (DE); Irmgard Heni, legal representative, Kernen (DE)

(73) Assignee: Daimler AG, Stuttgart (DE)

( * ) Notice: Subject to any disclaimer, the term of this patent is extended or adjusted under 35 U.S.C. 154(b) by 1138 days.

(21) Appl. No.: 10/515,231

(22) PCT Filed: Apr. 17, 2003

(86) PCT No.: PCT/EP03/04021
§ 371 (c)(1),
(2), (4) Date: Aug. 24, 2007

(87) PCT Pub. No.: WO03/099605
PCT Pub. Date: Dec. 4, 2003

(65) Prior Publication Data
US 2008/0220932 A1    Sep. 11, 2008

(30) Foreign Application Priority Data

May 24, 2002  (DE) .................................. 102 23 320
Jul. 11, 2002  (DE) .................................. 102 31 379

(51) Int. Cl.
*H02J 1/00* (2006.01)
*H02J 5/00* (2006.01)

(52) U.S. Cl. ........................................ 307/10.1; 307/9.1
(58) Field of Classification Search ................ 307/9.1, 307/10.1, 10.6
See application file for complete search history.

(56) References Cited

U.S. PATENT DOCUMENTS

| | | | | |
|---|---|---|---|---|
| 3,816,805 A * | 6/1974 | Terry | ............................. | 320/123 |
| 4,156,171 A * | 5/1979 | Kofink | ........................ | 320/123 |
| 4,210,856 A * | 7/1980 | Taylor | ........................... | 320/123 |
| 4,672,294 A * | 6/1987 | Norton | .......................... | 320/123 |
| 4,845,465 A * | 7/1989 | Kruse et al. | .................. | 340/468 |

(Continued)

FOREIGN PATENT DOCUMENTS

DE          3717716 A1    10/1987

(Continued)

OTHER PUBLICATIONS

Japanese Office Action dated Dec. 28, 2007 including English translation (Eight (8) pages).

*Primary Examiner* — Jared Fureman
*Assistant Examiner* — Adi Amrany
(74) *Attorney, Agent, or Firm* — Crowell & Moring LLP

(57) ABSTRACT

The invention relates to an apparatus and a method for starting an internal combustion engine for a motor vehicle, wherein the internal combustion engine has an associated electrical machine (1) which is operated as a starter/generator. During starting, the electrical machine (1) is supplied with a voltage which is obtained from addition or from subtraction of the voltages which are produced on a first energy store (3) and the voltages which are produced on a second energy store (4).

8 Claims, 3 Drawing Sheets

U.S. PATENT DOCUMENTS

Figure 1:
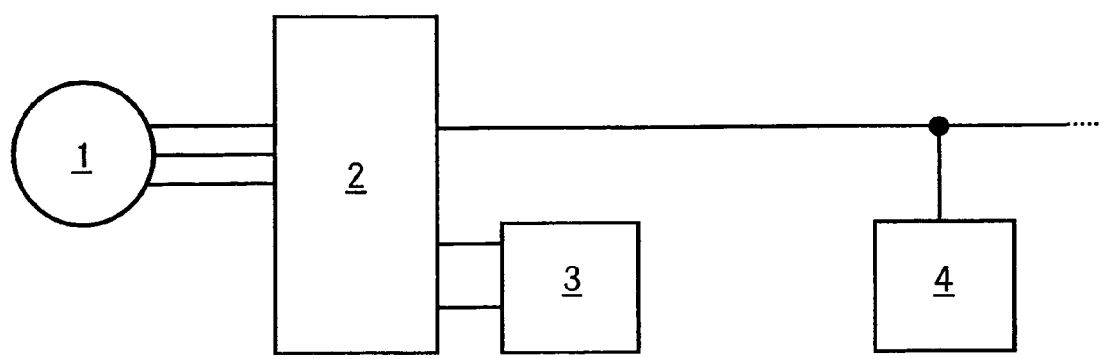

| | | | |
|---|---|---|---|
| 5,175,439 A * | 12/1992 | Harer et al. | 307/10.1 |
| 5,373,196 A * | 12/1994 | Faley | 307/46 |
| 5,513,718 A * | 5/1996 | Suzuki et al. | 180/65.26 |
| 5,710,699 A * | 1/1998 | King et al. | 363/132 |
| 5,717,310 A * | 2/1998 | Sakai et al. | 307/10.1 |
| 5,952,813 A * | 9/1999 | Ochiai | 320/104 |
| 5,977,652 A * | 11/1999 | Frey et al. | 307/10.1 |
| 5,977,657 A * | 11/1999 | Van Lerberghe | 307/44 |
| 6,134,875 A * | 10/2000 | Massey | 60/788 |
| 6,151,234 A | 11/2000 | Oldenkamp | |
| 6,202,615 B1 * | 3/2001 | Pels et al. | 123/179.3 |
| 6,218,643 B1 * | 4/2001 | Iwata et al. | 219/202 |
| 6,275,004 B1 * | 8/2001 | Tamai et al. | 320/118 |
| 6,323,608 B1 * | 11/2001 | Ozawa | 318/139 |
| 6,384,489 B1 * | 5/2002 | Bluemel et al. | 307/10.1 |
| 6,420,793 B1 * | 7/2002 | Gale et al. | 290/34 |
| 6,426,608 B2 * | 7/2002 | Amano et al. | 320/163 |
| 6,507,506 B1 * | 1/2003 | Pinas et al. | 363/79 |
| 6,515,455 B2 * | 2/2003 | Hidaka | 320/135 |
| 6,583,519 B2 * | 6/2003 | Aberle et al. | 307/10.1 |
| 6,861,767 B2 * | 3/2005 | Amano et al. | 307/10.1 |
| 6,876,556 B2 * | 4/2005 | Zhu et al. | 363/17 |
| 6,962,135 B2 * | 11/2005 | Kahlon et al. | 123/179.3 |
| 6,979,977 B2 * | 12/2005 | Amano et al. | 320/104 |
| 6,982,499 B1 * | 1/2006 | Kachi et al. | 307/75 |
| 7,096,985 B2 * | 8/2006 | Charaudeau et al. | 180/65.245 |
| 7,489,093 B2 * | 2/2009 | King et al. | 318/109 |
| 7,513,323 B2 * | 4/2009 | Gronbach | 180/65.1 |
| 2002/0167291 A1 * | 11/2002 | Imai et al. | 320/119 |

FOREIGN PATENT DOCUMENTS

| | | |
|---|---|---|
| DE | 4135025 A1 | 4/1992 |
| DE | 19903427 A1 | 8/2000 |
| DE | 19910330 A1 | 9/2000 |
| EP | 0410559 A2 | 1/1991 |
| EP | 0876554 B1 | 11/2000 |
| GB | 1 465 693 | 2/1977 |
| JP | 2-245446 A | 10/1990 |
| JP | 11-82253 A | 3/1999 |
| JP | 11-107892 A | 4/1999 |
| JP | 2000-291983 A | 10/2000 |

* cited by examiner

DRIVE SYSTEM FOR A MOTOR VEHICLE COMPRISING AN INTERNAL COMBUSTION ENGINE AND AN ELECTRIC MOTOR

The invention relates to a drive system having an internal combustion engine for a motor vehicle, and to a method for operation of a drive system having an internal combustion engine for a motor vehicle.

In the case of motor vehicles with a vehicle power supply system voltage of 14V, starters are used in order to start the internal combustion engine. In addition, generators are provided in the vehicle, and are used, inter alia and in particular, for so-called recuperation of, for example, braking energy. Both the starter and the generator are electrical machines. The introduction of the so-called start/stop mode and the use of the recuperated energy can lead to sustained fuel savings. However, the start/stop mode in particular cannot be carried out with present-day mass-produced starters and their mechanical links to a drive train, owing to convenience and life problems. The mechanical link to a drive train is provided by engagement or by means of a dry transmission. The starter and generator, as components, can each be optimized for their particular function.

If it is intended to use only one electrical machine both for starter operation and for generator operation in a vehicle power supply system, then difficulties arise in that, on the one hand, the necessary starting torque must be provided for the internal combustion engine while, on the other hand, sufficient generator power shall be produced, with high efficiency, over the entire rotation speed range of the internal combustion engine. Since, in consequence, this electrical machine must be connected to the crankshaft or to the drive shaft all the time, the choice of a high mechanical step-up ratio in its design in order to produce the starting torque is limited to a very much lower value, as a result of increased speed, than is the case with present-day mass-produced starters which can be disengaged. These difficulties are further exacerbated in that the electrical machine which is operated as a starter/generator and the architecture of the vehicle power supply system are intended to be used, preferably without any changes, in all types of engine in a range, in order to avoid different build standards. This problem is a result of the vehicle power supply system battery or vehicle power supply system energy store which is normally used, and which supplies the electrical machine with electrical energy and whose terminal power is often too low for starting by means of a starter/generator, in particular in 14V vehicle power supply systems.

EP 0 876 554 B1 discloses a starter/generator for an internal combustion engine for a motor vehicle, which has an inverter and an electrical rotating-field machine, with the latter carrying out the starter and generator function. The inverter is provided with an intermediate circuit whose voltage level is higher than that of a vehicle power supply system. The intermediate circuit is equipped with an energy store in order to store energy for starter operation. The energy is taken from the intermediate circuit when the electrical machine is being used for starting, and the energy is fed into the intermediate circuit at a higher voltage level when being used as a generator. The increased voltage level is preferably 350V.

One object of the invention is to provide a drive system for a motor vehicle having an internal combustion engine and an electrical machine. A further object of the invention is to provide a method for operation of a drive system such as this.

According to the invention, the object is achieved by the features of the independent patent claims.

The invention is characterized in that a first energy store and a second energy store, which preferably corresponds to a vehicle power supply system battery, are connected to one another in such a way that an electrical voltage which is higher than the vehicle power supply system voltage is produced when the electrical machine is being used for starting.

The first energy store may be in the form of a high-power store with a low energy content, which produces a higher current on its own or together with the second energy store than the second energy store on its own.

The invention has the advantage that the required starting power, in particular the required cold starting power, and the electrical voltage which is provided for the electrical machine during the starting process, as well as the available electric current, can be scaled as required. This scalability of the starting power allows the use of the drive system according to the invention with different engine types in a range of vehicles.

The use of two energy stores or power stores results in a high recuperation potential. Furthermore, the use of two energy stores results in the cycle load on the individual energy stores, in particular on the vehicle power supply system energy store or the vehicle power supply system battery, being low. The use of the invention leads to the required driving convenience for the start/stop mode, and to the components involved having a longer life. A stabilized vehicle power supply system can be provided for the start/stop mode and for recuperation.

Particularly in comparison to a combination of a starter/generator system with a two-voltage vehicle power supply system whose rated voltages are 14V and 42V, with a vehicle power supply system with a rated voltage of 14V, the invention is characterized by considerably lower implementation costs.

Figure 2:
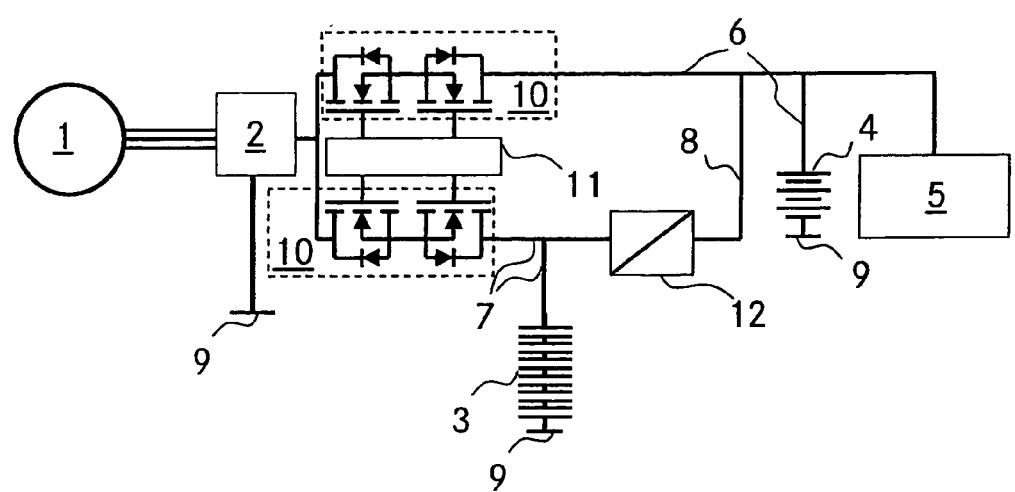
Figure 3:
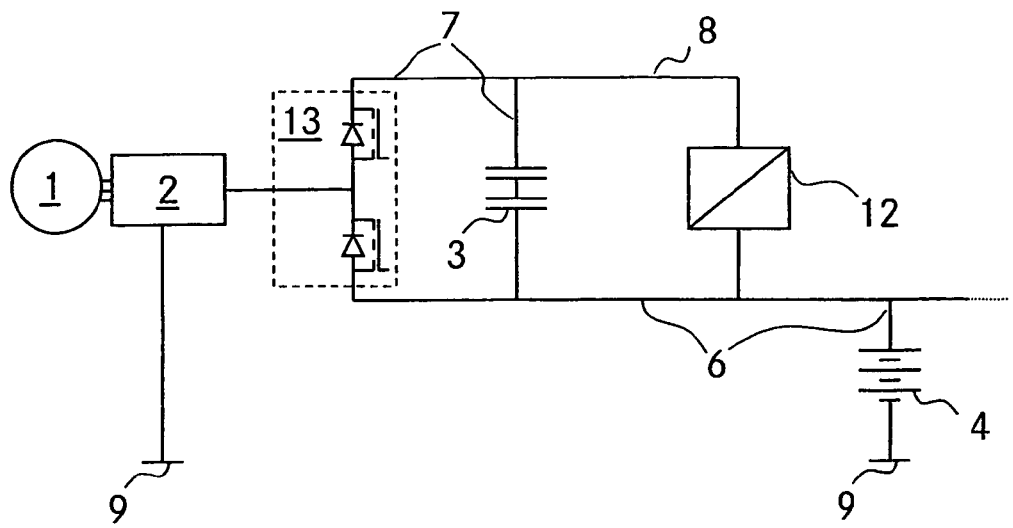
Figure 4:
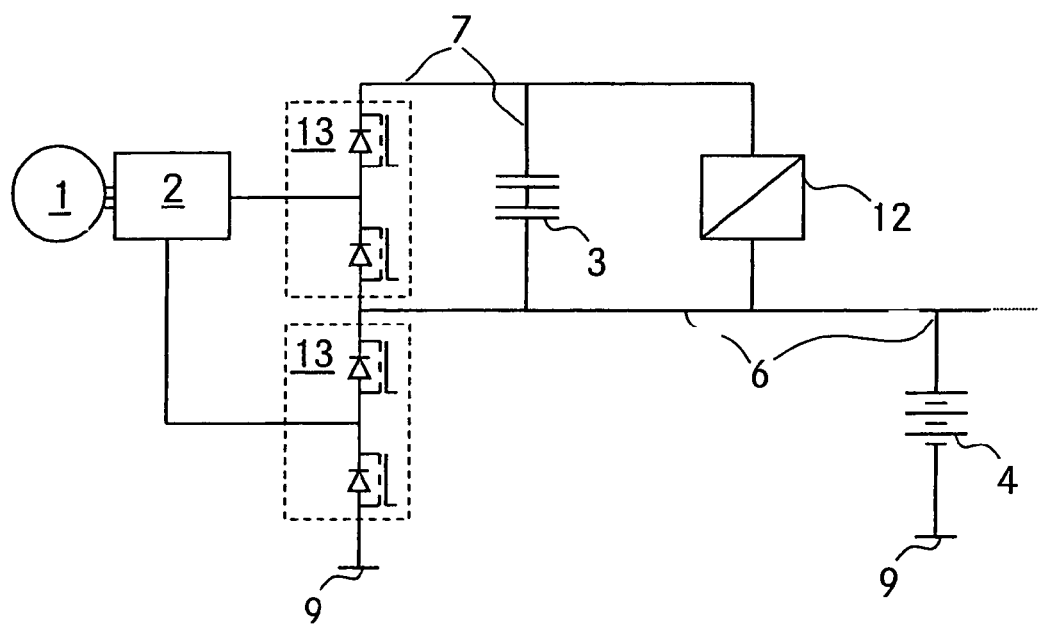
Figure 5:
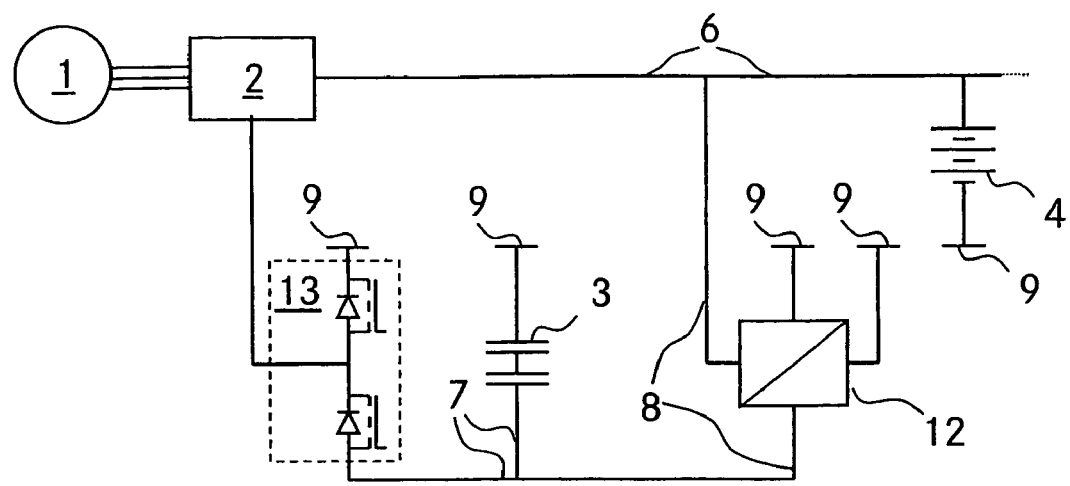
Figure 6:
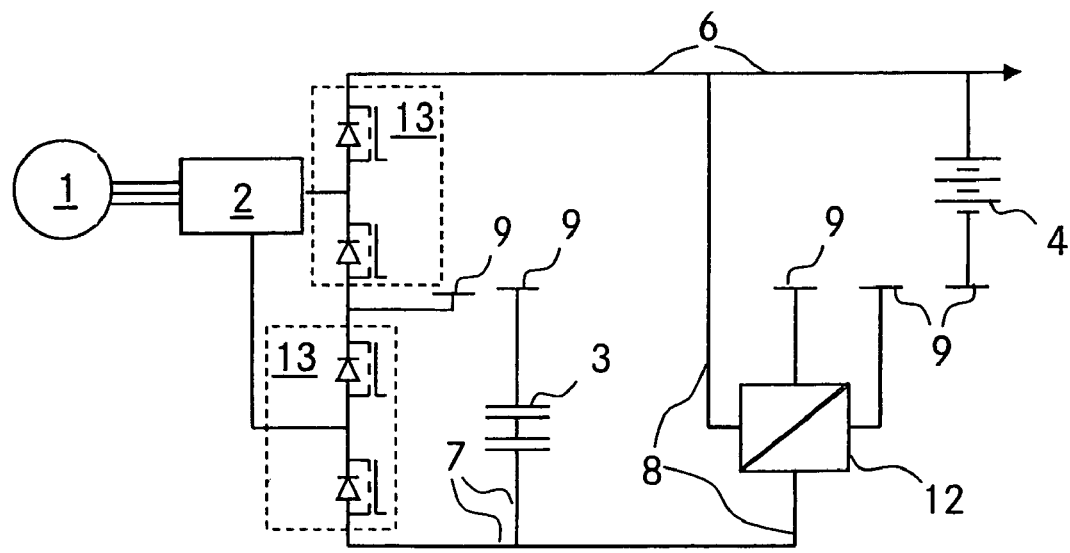

Further advantageous refinements of the invention will become evident from the dependent claims and from the exemplary embodiments which are described in the following text with reference to the drawing, in which:

FIG. 1 shows a schematic illustration of an electrical machine having an inverter and having a first and a second energy store, FIG. 2 shows a schematic illustration of a first embodiment of an electrical machine having an inverter, switching units and a first and a second energy store, FIG. 3 shows a schematic illustration of a second embodiment of an electrical machine having an inverter, a switching unit and a first and a second energy store, FIG. 4 shows a schematic illustration of a third embodiment of an electrical machine having an inverter, a switching unit, a switching unit in addition to that in the second exemplary embodiment and a first and a second energy store, FIG. 5 shows a schematic illustration of a fourth embodiment of an electrical machine having an inverter, a switching unit and a first and a second energy store, and FIG. 6 shows a schematic illustration of a fifth embodiment of an electrical machine having an inverter, a switching unit, a switching unit in addition to that in the fourth exemplary embodiment, and a first and a second energy store.

FIG. 1 shows a schematic illustration of an electrical machine 1, an inverter 2, a first energy store 3 and a second energy store 4. The electrical machine 1 is preferably an electrical three-phase machine, for example a synchronous machine or a transverse-flux machine, which can be operated and used as a starter/generator for an internal combustion engine, which is not illustrated, in a motor vehicle. Each phase (which is not illustrated) of the electrical machine 1 is connected via a line (which is not referred to in any more detail) to the inverter 2. The inverter 2 contains switching elements, in particular semiconductors such as so-called IGBTs and/or MOSFETs. Each phase is preferably a half-bridge arrangement (which is not illustrated) comprising two switching elements with associated rectifier elements or free-wheeling diodes, which are connected back-to-back in parallel. The expression inverter 2 may also cover power electronics, a power converter or a frequency converter. A first energy store 3 is connected to the inverter 2 via two lines, which are not shown in any more detail. The inverter 2 is connected to a second energy store 4 via a further line which is not shown in any more detail. A vehicle power supply system can be connected to the inverter 2, preferably in parallel with the second energy store 4, via this line which is not shown in any more detail. This is indicated by the dotted line in FIG. 1. The expression an energy store also covers a power store.

A so-called super capacitor, also referred to as a super cap or ultra cap, is preferably used as the first energy store 3. Alternatively, a battery or a combination of a super capacitor and a battery may also be used. A battery, in particular a vehicle battery, is preferably used as the second energy store 4. Alternatively, a super capacitor or a combination of a battery and a super capacitor may be used. The rated voltage of the vehicle power supply system is preferably 14V and the rated voltage of the second energy store 4 is preferably 12V.

FIG. 2 shows a schematic illustration of a first embodiment of an electrical machine 1, of an inverter 2, a switching unit 10, a first energy store 3 and a second energy store 4. FIG. 2 illustrates one specific embodiment of FIG. 1. Functionally identical components are provided with the same reference symbols as in FIG. 1. The phases (which are not illustrated) of the electrical machine 1, which can be operated and can be used as a starter/generator for an internal combustion engine (which is not illustrated) in a motor vehicle, are connected to the inverter 2 via lines which are not shown in any more detail. The inverter 2 is connected to ground a via a line which is not shown in any more detail. The ground 9 is preferably formed by the vehicle bodywork. Furthermore, the inverter 2 is connected via a line 7 to a first pole, which is not annotated in any more detail, of the first energy store 3.

The second pole, which is not annotated in any more detail, of the first energy store 3 is connected to ground 9. The inverter 2 is connected via a line 6 to a first pole, which is not annotated in any more detail, of the second energy store 4. The second pole, which is not annotated in any more detail, of the second energy store 4 is connected to ground 9. The first pole of the first energy store 3 is connected via a line 8 to the first pole, which is not annotated in any more detail, of the second energy store 4. A preferably bidirectional DC/DC converter 12 is arranged in the line 8. The first energy store 3 and the second energy store 4 are connected in parallel. A vehicle power supply system 5 is connected via a line which is not annotated in any more detail to the line 6 and/or to the first pole of the second energy store 4. Electrical loads such as fans, windshield wiper motors, controllers, lights and incandescent bulbs are arranged, for example, in the vehicle power supply system 5.

A switching unit 10 is provided in the line 6 between the inverter 2 and the second energy store 4. A switching unit 10 is likewise provided in the line 7 between the inverter 2 and the first energy store 3. The switching units 10 are preferably in the form of two switching elements, which are not annotated in any more detail and which may, if required, have so-called associated reverse diodes, which are not annotated in any more detail. The switching elements of the switching unit 10 can be driven via a control unit 11. This drive is provided via lines which are not annotated in any more detail.

During the starting process and while providing drive assistance for the internal combustion engine, the power supply for the electrical machine 1 may be provided either only by the first energy store 3 or only by the second energy store 4, or by both energy stores 3 and 4. The open-loop and/or closed-loop control which is used by the energy stores 3, 4 to supply the electrical machine 1 is provided by the control unit 11 and the switching units 10. The recuperation or recovering and storage of electrical energy from, by way of example, the braking energy of a motor vehicle are provided by storage of the energy in the first energy store 3 or by storage of the energy in the second energy store 4, or by storage of the energy in both energy stores 3 and 4. The electrical energy which is recovered can also be fed directly to the vehicle power supply system 5 via the line 6. This direct feed to the vehicle power supply system 5 can be provided in parallel with the charging of the second energy store 4. The vehicle power supply system 5 may also be supplied from the first energy store 3 and/or from the second energy store 4, provided that they or it have an appropriate amount of charge. Particularly after the vehicle has been stationary for a relatively long time, it may be necessary to charge the first energy store 3, which is preferably a super capacitor or a super cap/ultra cap. This charging process can be carried out by means of the second battery 4, or by means of recuperation from recovered energy.

The first pole of the first energy store 3 is preferably at a potential which is between 8 and 20 V. The first energy store 3 preferably has a rated voltage of 20 V. The first pole of the second energy store 4 is preferably at a potential of 14 V. The second energy store 4 preferably has a rated voltage of 12 V.

FIG. 3 shows a schematic illustration of a second embodiment of an electrical machine 1, an inverter 2, a switching unit 13, a first energy store 3 and a second energy store 4. In the embodiment illustrated in FIG. 3, the first energy store 3 and the second energy store 4 are connected in series. Components having the same functional effect as in the previous figures are provided with the same reference symbols. The phases (which are not illustrated) of an electrical machine 1 are connected via lines (which are not annotated in any more detail) to the inverter 2, which is connected to ground 9 via a line which is not annotated in any more detail. A first pole, which is not annotated in any more detail, of a first energy store 3 is connected to the inverter 2 via a line 7. A first pole, which is not annotated in any more detail, of a second energy store 4 is connected via a line 6 to the inverter 2. The second pole, which is not annotated in any more detail, of the first energy store 3 is connected to the line 6, and is thus connected to the first pole of the second energy store 4. The second pole, which is not annotated in any more detail, of the second energy store 4 is connected to ground 9. The first pole of the first energy store 3 is connected via a line 8, in which a DC/DC converter is arranged, to the line 6, and to the first pole of the second energy store 4. The line 6 or the first pole of the second energy store 4 is connected to a further line, which is not annotated in any more detail and which represents a connection to a vehicle power supply system. The connection to the vehicle power supply system is represented by a dotted line.

A switching unit 13 is arranged between the inverter 2 and the energy stores 3, 4. This switching unit preferably contains two switching elements, which are not annotated in any more detail, for example semiconductor switches, which may be associated with reverse diodes, which are not annotated in any more detail. The switching elements in the switching unit 13 are driven via a control unit 11, which is not illustrated. One switching element in the switching unit 13 is arranged in the line 7 between the inverter 2 and the first energy store 3. The second switching element in the switching unit 13 is arranged in the line 6 between the inverter 2 and the second energy store 4. The switching elements in the switching unit 13 are used to control the current flows via the energy stores 3, 4.

During starting, in particular cold starting, and when providing drive assistance for the internal combustion engine, so-called boost, the current preferably flows from the vehicle power supply system and the second energy store 4 via the first energy store 3 to the electrical machine 1. During hot starting, on the other hand, it may be sufficient to draw the electrical energy only from the second energy store 4. Recovered energy, for example from braking processes of a motor vehicle, can be fed into the vehicle power supply system via the line 7 and the first energy store 3, for recuperation and for supplying the vehicle power supply system. The recovered energy may also be fed directly into the vehicle power supply system via the line 6, for example if the first energy store 3 is fully charged. The recovered energy may also be used to charge the second energy store 4.

If the first energy store 3 has been charged with a certain amount of charge, for example by recuperation, then the vehicle power supply system can be supplied with electrical energy from the first energy store 3. The vehicle power supply system can likewise be supplied with electrical energy by means of the second energy store 4. In order to prepare for a starting process, in particular a cold start, the first energy store 3 may be charged with electrical energy from the second energy store 4.

The second pole of the first energy store 3 and the first pole of the second energy store 4 are preferably at a potential of 14 V. The first pole of the first energy store 3 is preferably at a potential of 14 V+a voltage with the value x V. This additional, additive voltage x is obtained from the voltage across the first energy store 3. The voltage with which the electrical machine can be supplied is thus obtained from addition of the voltage across the first energy store 3 to the potential at the first pole of the second energy store 4 and at the second pole of the first energy store 3.

The value of the additional voltage x may be matched to the specific requirements of the engine type or the vehicle within a range. Voltage x which can be scaled particularly easily can be produced by using two or more super caps or super capacitors connected to one another as the first energy store 3, designed, for example, in steps of about 2.5 V. The individual super caps are preferably connected in series with one another. Only a minimum amount of additional storage volume is thus advantageously required for the second energy store 4, in the form of the first energy store 3, in order to achieve the increase of x in the voltage potential.

FIG. 4 shows a schematic illustration of a third embodiment of an electrical machine 1, an inverter 2, switching units 13, a first energy store 3 and a second energy store 4. FIG. 4 illustrates a further development of the embodiment illustrated in FIG. 3. Components with the same functional effect are provided with the same reference symbols as in the previous figures. In addition to the embodiment illustrated in FIG. 3, a further, second switching unit 13 is provided. The second switching unit 13 connects the first switching unit 13 to ground 9. A connection to the first pole, which is not annotated in any more detail, of the second energy store 4 is provided between the first and the second switching unit 13. This connection represents a part of the line 6. The second switching unit 13 likewise has two switching elements, which are not annotated in any more detail and can be associated with reverse diodes, which are not annotated in any more detail. In contrast to FIG. 3, the inverter 2 is not connected directly to ground 9, but is connected to the junction point between the first and the second switching elements, in the switching unit 13.

In this embodiment, starting processes and assistance to the drive (boost) can advantageously be provided solely by the first energy store 3. Recuperation and storage of recovered energy can likewise be carried out solely in the first energy store 3. Starting processes, assistance to the drive and recuperation need no longer necessarily be passed via the second energy store 4. This leads to a reduction in the cycle load and thus to lengthening of the life of the second energy store 4. This also leads to stabilization of the vehicle power supply system, and to a stabilized vehicle power supply system. The second energy store 4 is preferably used for assistance during cold starting.

In the exemplary embodiments shown in FIGS. 3 and 4, a second pole of the first energy store 3 and a first pole of a second energy store 4 are at a common potential. The first pole of the first energy store 3 is preferably at a potential which is higher than the potential at the second pole of the first energy store 3 and at the first pole of the second energy store 4. The potential at the second pole of the first energy store 3 and at the first pole of the second energy store 4 is once again preferably higher than the potential at the second pole of the second energy store 4. The second pole of the second energy store 4 is preferably connected to ground 9, with the ground being provided by the vehicle bodywork.

FIG. 5 shows a schematic illustration of a fourth embodiment of an electrical machine 1, an inverter 2, a switching unit 13, a first energy store 3 and a second energy store 4. Components which functionally have the same effect are provided with the same reference symbols as in the previous drawings. The difference between the embodiment illustrated in FIG. 5 (and the embodiment illustrated in FIG. 6 which will be described further below in the text) and the embodiments shown in FIGS. 3 and 4 is that the first pole of the first energy store 3 is not at a floating or varying potential above the potential of the first pole of the second energy store 4, as is the case in the embodiments 3 and 4. In FIGS. 5 and 6, the second pole of the first energy store 3 is at a potential which is below the potential at the second pole of the second energy store 4.

In FIG. 5 an electrical machine 1 which can be operated and used as a starter/generator for an internal combustion engine, which is not illustrated, in a motor vehicle, is connected to an inverter 2 via lines which are not annotated in any more detail. The inverter 2 is connected via a line 6 to a first pole, which is not annotated in any more detail, of a second energy store 4. The second pole, which is not annotated in any more detail, of the second energy store 4 is preferably connected to ground 9. The inverter 2 is connected to a switching unit 13 via a line which is not annotated in any more detail.

The switching unit 13 has two switching elements which are not annotated in any more detail and which may have associated reverse diodes, which are not annotated in any more detail. The junction point between the inverter 2 and the switching unit 13, via a line which is not annotated in any more detail, is located between the two switching elements. The pole at the lower potential of the switching unit 13 is preferably connected via a line 7 to a second pole, which is not annotated in any more detail, of a first energy store 3. The pole of the switching unit 13 which is at a higher potential than the other is preferably connected to ground 9. A second pole, which is not annotated in any more detail, of the first energy store 3 is likewise preferably connected to ground 9.

The second pole of the first energy store 3 is connected via a line 8 to the line 6 and to the first pole of the second energy store 4. A DC/DC converter 12 is arranged in the line 8 and is connected to ground 9 via a line which is not annotated in any more detail. The vehicle bodywork preferably forms the ground 9.

The first pole of the second energy store 4 is preferably at a potential of 14 V. The second pole of the first energy store 3 is preferably at a potential of –x V. Thus, overall, the electrical machine 1 can be supplied with a maximum of 14 V–(–x) V=14 V+x V from the first and from the second energy stores 3 and 4. The voltage with which the electrical machine can be supplied is thus obtained from subtraction of the potential at the second pole of the first energy store 3 from the potential at the first pole of the second energy store 4, or from addition of the magnitude of the potential at the second pole of the first energy store 3 to the potential at the first pole of the second energy store 4.

FIG. 6 shows a schematic illustration of a fifth embodiment of an electrical machine 1, an inverter 2, switching units 13, a first energy store 3 and a second energy store 4. The differences between the embodiment shown in FIG. 6 and the embodiment shown in FIG. 5 correspond to the differences between the embodiment shown in FIG. 4 and the embodiment shown in FIG. 3. An additional switching unit 13 is provided, and is connected to the inverter 2 and the line 6. The second switching unit 13 preferably has two switching elements, which may have associated reverse diodes, which are not annotated in any more detail, and between which a line is provided which connects the switching unit 13 to the inverter 2. One pole of the switching unit 13 is connected to the line 6. The other pole of the switching unit 13, which is at a lower potential, and is preferably connected to ground 9, is connected to the first switching element 13. Starting processes, processes to assist the drive and recuperation (although this list is not exhaustive) can be passed by the first energy store 3, in the same way as in FIG. 4, without having to include the second energy store 4.

In the embodiments illustrated in FIGS. 5 and 6, a first pole of a first energy store 3 and a second pole of a second energy store are at a common potential. The first pole of the second energy store 4 is preferably at a potential which is higher than the potential at the second pole of the second energy store 4 and at the first pole of the first energy store 3. The second pole of the first energy store 3 is preferably once again at a potential which is lower than the potential at the first pole of the first energy store 3 and at the second pole of the second energy store 4. The first pole of the first energy store 3 and the second pole of the second energy store 4 are preferably connected to ground 9. If the first pole of the first energy store 3 is connected to ground 9, then the second pole of the first energy store 3 is at a negative potential.

The electronic units which are illustrated in the embodiments shown in FIGS. 1-6 and which are provided by the inverter 2, the switching units 10, 13 and the DC/DC converter 12 may be integrated in an overall electronics unit. This overall electronics unit may be located in a housing. The switching elements and power splitters which are provided in the switching units may preferably be formed by semiconductor components, such as IGBTs and/or MOSFETs. These are preferably connected in the form of half bridges.

The described embodiments may be used not only for 14 V vehicle power supply systems, but are also suitable for combination with vehicle power supply systems with other rated voltages, such as a 42 V vehicle power supply system. A corresponding vehicle power supply system battery or a corresponding energy store 4 must be provided. The second energy store 4 for a 42 V vehicle power supply system should preferably have a rated voltage of 36 V.

The voltage which is provided by the invention of 14+x V, and the rated voltage of the vehicle power supply system of +x V may be used as the rated voltage for a further vehicle power supply system, which may be integrated in a vehicle.

It should also be noted that a different potential may also be used rather than the ground 9 that is used in the exemplary embodiments and whose potential is 0 V.

The invention claimed is:

1. A drive system for a motor vehicle comprising:
   an internal combustion engine, the internal combustion engine having an associated electrical machine which can be operated as a starter/generator,
   a first energy store having a first pole interconnected by a first line to both a bidirectional DC/DC converter and a switching unit, and a second pole interconnected by a second line to said switching unit, said bidirectional DC/DC converter, and an electrical vehicle power supply system of the motor vehicle having electrical loads utilized during motor vehicle operation,
   an inverter interposed between said electrical machine and said switching unit, and
   a second energy store having a first pole interconnected by said second line to the switching unit, the second pole of the first energy store, the bidirectional DC/DC converter, and the electrical vehicle power supply system of the motor vehicle,
   wherein the bidirectional DC/DC converter is arranged in parallel with the first energy store,
   wherein the switching unit contains a first semiconductor switch and a first diode between the inverter and the first line and a second semiconductor switch and a second diode between the inverter and the second line, and
   wherein said second pole of the first energy store and said first pole of the second energy store are at a common potential.

2. The drive system as claimed in claim 1, wherein the first pole of the second energy store is at a positive potential, and the second pole of the second energy store is at a negative potential or ground.

3. The drive system as claimed in claim 1, wherein the common potential is formed by the motor vehicle bodywork.

4. The drive system as claimed in claim 3, wherein said first energy store produces a higher current than the second energy store.

5. The drive system as claimed in claim 1, wherein said switching unit is provided between the inverter and the first energy store.

6. The drive system as claimed in claim 1, wherein the first energy store comprises a super capacitor.

7. The drive system as claimed in claim 1, wherein said first energy store produces a higher current than the second energy store.

8. The drive system as claimed in claim 1, wherein said switching unit is a first switching unit, and further comprising a second switching unit disposed between the inverter and said first switching unit, said first energy store, said bidirectional DC/DC converter, said energy store, and said electric vehicle power supply system.

* * * * *